H. L. & C. P. BROWN.
Seed-Dropper.
No. 35,501. Patented June 10, 1862.
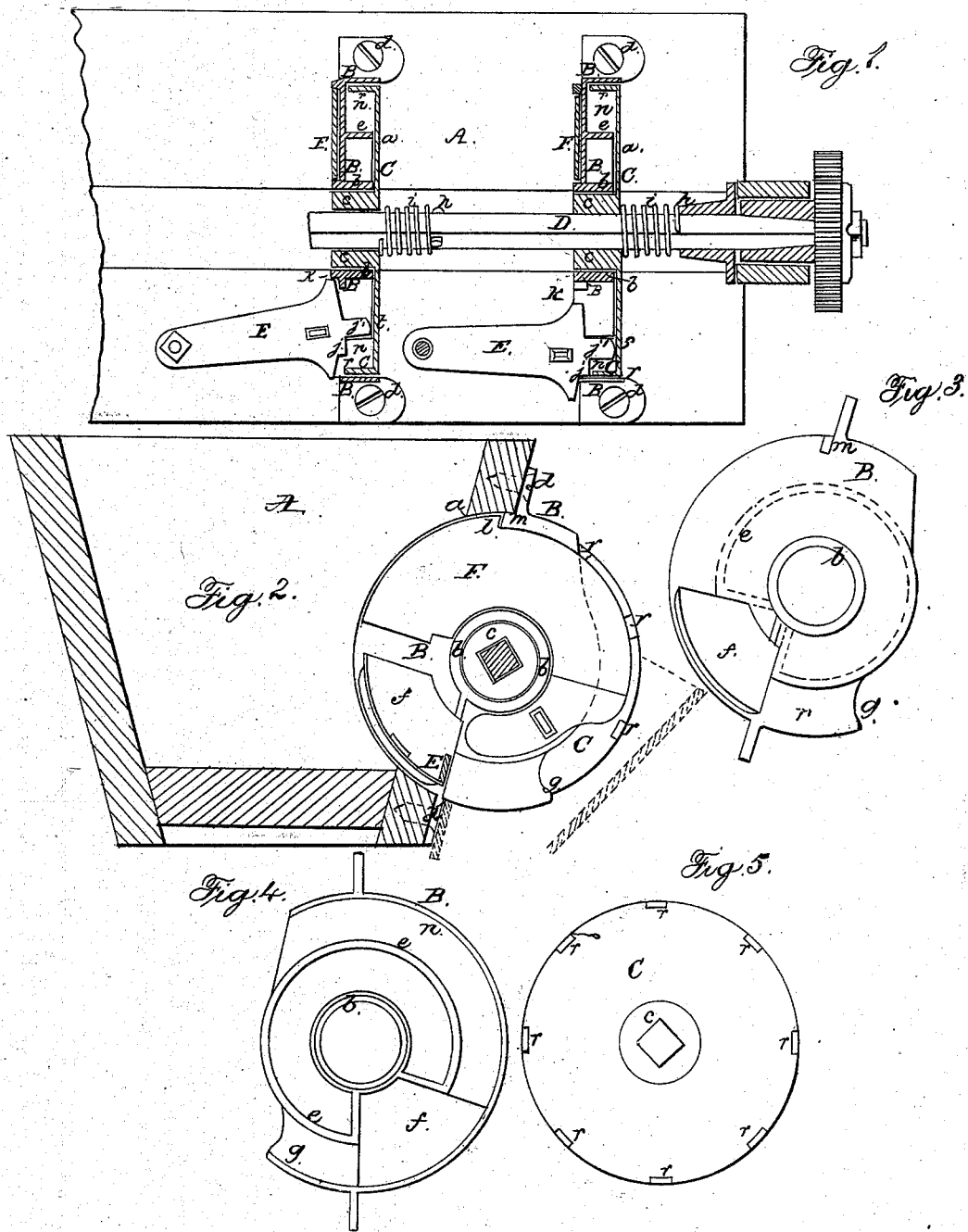

UNITED STATES PATENT OFFICE.

HIRAM L. BROWN AND CALVIN P. BROWN, OF SHORTSVILLE, NEW YORK.

IMPROVEMENT IN GRAIN-DRILLS.

Specification forming part of Letters Patent No. 35,501, dated June 10, 1862.

*To all whom it may concern:*

Be it known that we, H. L. BROWN and C. P. BROWN, both of Shortsville, in the county of Ontario and State of New York, have invented certain new and useful Improvements in Drills for Sowing Grain and Seeds of different Sizes and Characters; and we do hereby declare that the following is a full, clear, and exact description of the same, reference being had to the accompanying drawings, forming part of this specification, in which—

Figure 1 is a rear elevation of a portion of a seed-drill hopper, and a sectional view of the distributing parts as improved by us. Fig. 2 is a transverse section of the same. Figs. 3, 4, and 5 are details of the distributing apparatus.

Similar letters of reference in the several figures indicate corresponding parts.

On the 4th day of November, A. D, 1851, we, in connection with Newton Foster and Gilbert Jessup, obtained Letters Patent on a new arrangement of flanged disks upon a horizontal shaft for distributing grain; and our present improvements relate to a method of regulating the capacity of the distributing-orifice or discharge-passage of the said patented arrangement of disks; also, to a mode of constructing the disks so that they operate in connection with a square or many-sided shaft, and likewise to a new arrangement of the cut-off.

To enable others skilled in the art to make and use our invention, we will proceed to describe its construction and operation.

A is a hopper, with its front and rear portions inclined. In the rear part a series of rectangular apertures, *a a*, are cut through, and through these apertures distributers extend some distance into the hopper-chamber, so as to take seed therefrom and deposit it into conductors which lead to the drill-teeth, in about the same manner as is described and shown in the patent of Foster, Jessup, Brown, and Brown, heretofore alluded to.

We construct the stationary flanged disk B of the distributers with a box, *b*, which extends beyond both its inner and outer faces, and on the central part of the inner face of the revolving toothed disk C *r* a hub, *c*, with a square eye through it, and the disk is cast. The hub enters the box *b*, and thus the stationary disk B, which is bolted at *d d* to the back of the hopper, supports the revolving disk. The stationary disk is of course constructed with the flange *e*, which forms, with the moving disk, the narrow cylindric channel *n* for the seed to pass from the hopper to the conductor of the seed-tubes. It also has the usual admission-orifice, *f*, in its face, and the exit-passage *g* in the circumference of its flanged portion, the former being made by cutting a segment out of that portion of the face of the disk which is within the hopper, and the latter formed by cutting away a portion of the cylindric flange outside of the hopper, and leaving the ends of the cut portion of the flange with a beveled terminus, as shown. Through the square eye of the revolving disks a square driving-shaft, D, is fitted loosely, so as to allow said disks to slide longitudinally, and between shoulders *h h* of the shaft and the outer faces or the moving disks springs or yielding devices *i i* are arranged, so that the disks may be held up to the stationary disks with a yielding force, and thus be capable of "giving" when the distributer becomes clogged or is subjected to the resistance of an unyielding obstruction. The greatest benefit of this arrangement is the saving of the grain from undue pressure in its passage to the conductors.

It will be observed that the shaft is supported by the disks, rather than its supporting the disks, as in the patent of 1851, above referred to.

In connection with this arrangement we use a gage-plate, E, the same being fastened by one end to the back of the hopper, and constructed with a shoulder, *j*, or angular tongue *j j'* at its other end. This tongued end of the plate E extends through the lower termination of the inlet-orifice *f* of the stationary disk, and extends by its tongue across the narrow cylindric seed-channel of the two disks. The tongue, by being raised or lowered across the channel, gages the quantity of seed discharged, or adapts the channel for wheat, oats, corn, peas, or beans, accordingly as circumstances may require. The outer end of the plate being secured by a nut and screw and the hole or slot through which the screw passes being larger than the screw, the plate can be turned up or down on the screw the extent required, and then confined.

Various modes of arranging the gage-plate or an equivalent device in connection with disk-distributers might be devised without departing from the principle of our invention. Therefore we do not limit ourselves to any particular means for decreasing or increasing the size of the cylindric seed-channel formed by flanged disks, but desire to cover the principle embodied in the means—to wit, regulating or gaging the size of a cylindric seed-channel formed by flanged disks placed vertically on a horizontal shaft.

To cut off the supply of seed from any one of the distributers while the others are in use, a curved slide, F, is hung upon the outer extension of the box b, so as to revolve or turn upon it. This cut-off has a shoulder, l, on its circumference, so that when it is raised it shall bear against a stop, m, of the stationary disk, and through its gravity remain open. This cut-off differs in its arrangement only from the cut-off shown in the patent of 1851, before referred to, and this arrangement possesses the advantage of rendering the cut-off self-locking by its gravity when opened as well as when closed.

The operation is as follows: Seed being placed in the hopper and the distributers revolved by the shaft, the seed, which runs by its gravity from the hopper into the cylindric channel n, is forced along to the discharge-passage by the horizontal teeth or spurs r r, and thus continuously discharged into the conductor (shown in red lines,) and therefrom into drill-tubes. If the seed is small, the gage-plate E is lowered across the cylindric channel n, as illustrated at s; but if it is large, the plate is allowed to remain as illustrated at t, Fig. 1.

What we claim as our invention, and desire to secure by Letters Patent, is—

1. The arrangement of the flanged disks B C, circular channel n, and adjustable gaging device E, substantially in the manner and for the purpose described.

2. The arrangement of the flat-sided shaft D, disk C, with inner hub, c, and stationary disk B, with box b, substantially in the manner and for the purpose described.

3. The arrangement of the cut-off F and outer extension of the box b, in combination with the inlet-orifice f, substantially in the manner and for the purpose described.

HIRAM L. BROWN.
CALVIN P. BROWN.

Witnesses:
I. R. PARCELL,
A. E. WARNER.